(12) United States Patent
Oh et al.

(10) Patent No.: US 7,711,079 B2
(45) Date of Patent: May 4, 2010

(54) LOWER AND UPPER END PLUGS OF AN ANNULAR FUEL ROD

(75) Inventors: Dong Seok Oh, Daejeon-si (KR); Chun Tae hyun, Daejeon-si (KR); In Wang kee, Daejeon-si (KR); Shin Chang hwan, Gyeonggi-do (KR); Kim Hyung Kyu, Daejeon-si (KR); Lee Young ho, Daejeon-si (KR); Yang Yong sik, Daejeon-si (KR); Bang Je geon, Daejeon-si (KR); Song Kee Nam, Daejeon-si (KR); Song Kun woo, Daejeon-si (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 11/777,317

(22) Filed: Jul. 13, 2007

(65) Prior Publication Data

US 2008/0013667 A1    Jan. 17, 2008

(30) Foreign Application Priority Data

Jul. 15, 2006    (KR) ...................... 10-2006-0066615

(51) Int. Cl.
*G21C 3/34*    (2006.01)
*G21C 3/10*    (2006.01)
(52) U.S. Cl. ...................................... 376/440; 376/451
(58) Field of Classification Search ................. 376/440, 376/451
See application file for complete search history.

(56) References Cited

U.S. PATENT DOCUMENTS 4,675,154 A * 6/1987 Nelson et al. ................ 376/444
4,828,791 A * 5/1989 DeMario ..................... 376/352
5,158,740 A * 10/1992 Boatwright .................. 376/261
5,663,993 A * 9/1997 Danielson et al. ........... 376/444

OTHER PUBLICATIONS

Kazimi, M.S., Hejzlar, P., High Performance Fuel Design for Next Generation PWRs: Final Report, MIT-NFC-PR-082, Jan. 2006.*
① Thermal Hydraulic Design of High Power Density Fuel for PWRs—by Dandong Feng, Pavel Hejzlar, Mujid S.Kazimi—The 10th International Topical Meeting on Nuclear Reactor Thermal Hydraulics(NURETH-10), Seoul, Korea, Oct. 5-9, 2003.
Annular Fuel for High Power Density PWRs : Neutronic and Thermal Hydraulic Considerations—By Pavel Hejzlar, Dangdong Feng, Yasuyki Otsuka, Zhiwen Xu, Won Jae Lee, Mujid Kazimi—Advances in Nuclear Fuel Management III (ANFM 2003), Hilton Head Island, South Carolina, USA, Oct. 5-8, 2003, American Nuclear Society, LaGrange Park II.
Development of a Thermal-hydraulic analysis code for annular fuel assemblies—by Kyu Hyun Han, Soon Heung Chang- www.sciencedirect.com, Nuclear Engineering and Design pp. 267-275, Nov. 7, 2003.
Feasibility Study of Double-cooled Annular Fuel with KSNP (II)- by DongSeok Oh, YoungSik Yang, YoungHo Lee, ChangHwan Shin, WangKee In, KangSeok Kim, TaeHyun Chun, KunWoo Song- Korean Atomic Power Conference, Autumn, 2005.

* cited by examiner

*Primary Examiner*—Rick Palabrica
*Assistant Examiner*—Erin M Boyd
(74) *Attorney, Agent, or Firm*—Bachman & LaPointe, P.C.

(57) ABSTRACT

A lower and upper end plugs of an annular fuel rod, into and out of which cooling water flows, comprises: a lower end plug including a filter for debris which has a plurality of pins intersecting each other at the proper position of an inner channel main inlet, through-holes into which the pins of the debris filter are fitted, and at least one inner channel auxiliary inlet through which the cooling water flows into a lower inner channel thereof when the inner channel main inlet is blocked by debris, and which has a through-hole shape; and an upper end plug including at least one upper handling groove and hole, into which a fuel rod handling tool is coupled, at a proper position of an inner circumference of the inner channel main outlet in a circumferential direction.

5 Claims, 16 Drawing Sheets

LOWER AND UPPER END PLUGS OF AN ANNULAR FUEL ROD

BACKGROUND OF THE INVENTION

1. Field of the Invention

The present invention relates to an annular fuel rod, and more particularly to a lower and upper end plug of an annular fuel rod, in which a filter for debris is installed in front of the inner channel main inlet of a lower end plug, thereby intercepting an inflow of debris in which at least one inner channel auxiliary inlet with a through-hole shape is formed in a cylindrical wall of said lower end plug, thereby supplying cooling water when the debris is caught up in the debris filter to thus prevent the inner surface temperature of a fuel rod from increasing excessively and in which the upper end plug is provided with a groove in which a tool for pulling the fuel rod is located, thereby making it easy to handle the fuel rod when a nuclear fuel assembly is being assembled or disassembled.

2. Description of the Prior Art

In general, a commercial nuclear power plant is equipped with nuclear fuel assemblies. As illustrated in FIGS. 1 and 2, the nuclear fuel assembly 100 comprises fuel rods 101, guide tubes 103, grid spacers 105, a lower end fitting 106, and an upper end fitting 107.

Each fuel rod 101 is provided with lower and upper end plugs 108 and 109 at lower and upper ends thereof.

Here, each fuel rod 101 has cylindrical uranium pellets inserted into a cladding tube of zirconium alloy. These uranium pellets undergo nuclear fission to generate a high-temperature heat.

Meanwhile, the support grids 105 support the fuel rods 101 and function to maintain a distance between the fuel rods 101. Each guide tube 103 is used as a passage for a control rod that moves up and down in order to control a heat flux of the fuel rods 101.

The upper end fitting 107 and the lower end fitting 106 function to hold and support the nuclear fuel assembly 100 to the upper and lower structure of a reactor core. If necessary, the lower end fitting 106 includes a filter (not shown) for filtering debris floating in the reactor core.

Meanwhile, the lower and upper end plugs 108 and 109 installed at the lower and upper ends of each fuel rod have a conical shape, are welded to the cladding tube (not shown), and prevent the internal gas charged into the cladding tube from leaking out.

Generally, 150 or more nuclear fuel assemblies 100 are loaded into the reactor core.

Meanwhile, the nuclear fuel assembly 100 has cylindrical fuel rods, and is designed so that the cooling water flows through subchannels, each of which are surrounded by four rods or a combination of three rods 101 and one guide tube 103, in an axial direction, or gaps between the rods 101.

At this time, each subchannel 111, surrounded by the rods 101, refers to a channel, the circumference of which is typically partly open to allow fluid to freely move to an adjacent subchannel when used.

As illustrated in FIGS. 3, 4 and 5, there has been disclosed an annular fuel rod 201 that is different from the cylindrical fuel rod has been reported (U.S. Pat. No. 3,928,132 (1975), title: Annular Fuel Element for High-Temperature Reactors, and inventor: Roko Bujas).

Here, each annular fuel rod 201 comprises at least one annular pellet 203, an inner cladding tube 205 provided at an inner circumference of the pellet 203, and an outer cladding tube 207 provided at an outer circumference of a pellet 203.

For this configuration, cooling water flows through the external subchannels 213 and inner channels 211 of the fuel rods 201 at the same time, and absorbs the heat generated from the fuel rods 201. However, an annular fuel rod 201 increases its heat area per bundle to decrease its heat flux, so that it can maintain a low inner surface temperature therein, when compared to a cylindrical fuel rod.

In this manner, in the case in which a low inner surface temperature of each fuel rod 201 is maintained, the possibility of damaging a fuel surface due to an increase in the inner surface temperature is reduced, and thus the safety allowance limit of the fuel rods 201 can be increased.

In the above-described cylindrical fuel rods and annular fuel rods, each cylindrical fuel rod is characterized in that, because the cooling water flows through the subchannels, the cooling water moves freely between the adjacent subchannels. This movement of the cooling water between the adjacent subchannels is based on various factors. The main factor is the loss of pressure generated in the subchannel region, and thus a movement of the cooling water occurs in order to maintain an equilibrium pressure.

Meanwhile, in the case of the annular fuel rod, an external subchannel exchanges cooling water freely with the adjacent external auxiliary channels, because the inner channel makes it impossible for the cooling water to move between the channels because it is enclosed by the inner cladding tube.

Therefore, the debris floating in the cooling water is caught in the inner channel, thereby blocking the inner channel. Further, in a case where the debris blocks the inner channel, it obstructs the flow of the cooling water to reduce the flow rate in the inner channel. For this reason, the heat generated from the wall of the inner channel cannot be sufficiently removed, and thus the temperature of the channel wall surface increases. Furthermore, when the temperature continues to increase, the wall surface of the inner channel is damaged which can cause accidents such as damage to the nuclear reactor. Accordingly, the advantages of the annular fuel rod are decreased.

As described above, in order to prevent the temperature from excessively increasing at the surface wall of the channel, a smooth supply of cooling water to the channel is important when operating a nuclear reactor. To this end, it is important to secure a fluid channel to supply the cooling water, capable not only of minimizing the amount of debris flowing into the inner channel but also cooling the surface of the inner channel even if debris caught in the debris filter blocks the main inlet of the inner channel.

To this end, a nuclear fuel assembly, to which a filter for removing the debris floating in the inner channel is applied, was proposed by Korean Patent No. 10-0074788 (1994), 10-0077453 (1994), 10-0074788 (1994), 10-0010878 (1999), 10-0453268 (2004), and so on. However, the existing debris filter is applied to an existing nuclear fuel assembly with cylindrical fuel rods, and is adapted to be integrally formed with a lower end fitting. For this reason, there is a possibility of debris flowing through a gap between the lower end fitting and the adjacent lower end fitting and through a gap between the lower end fitting and the wall of a reactor core, to thus enter into the subchannels.

Further, the debris filter of the lower end fitting of the nuclear fuel assembly cannot completely filter the debris, and thus the debris flowing from the lower end fitting flows into the subchannel.

SUMMARY OF THE INVENTION

Accordingly, the present invention has been established by bearing in mind the above problems occurring in a prior art, and an object of the present invention is to provide lower and upper plugs of an annular fuel rod, in which a filter for debris is installed in the inner channel main inlet of a lower end plug, thereby intercepting an inflow of debris, in which at least one inner channel auxiliary inlet with a through-hole shape is formed in the cylindrical wall of the lower end plug, thereby supplying cooling water when the debris is caught up in the debris filter to thus prevent the inner surface temperature of the fuel rod from increasing excessively and in which an upper end plug is provided with a groove in which a tool for pulling the fuel rod is located, thereby making it easy to handle the fuel rod when a nuclear fuel assembly is being assembled or disassembled.

In order to achieve the above object, according to the present invention, lower and upper plugs of an annular fuel rod are provided, in which the plug assembly has a lower end plug, which is installed at a lower end of the fuel rod as an annular shape, which is provided, in the center thereof, with a lower inner channel into which cooling water flows, and which has an inner channel main inlet, and an upper end plug which is installed at an upper end of the fuel rod as a cylindrical shape, which is provided, in the center thereof, with an upper inner channel out of which the cooling water flows, and which has an inner channel main outlet, for a plug assembly comprising: an upper end plug including a filter for debris which has a plurality of pins intersecting each other at a proper position of the inner channel main inlet, through-holes into which the pins of the debris filter are fitted, and at least one inner channel auxiliary inlet through which the cooling water flows into the lower inner channel when the inner channel main inlet is blocked by debris, and which has a through-hole shape; and an upper end plug assembly including at least one with an upper handling groove and hole, into which a fuel rod handling tool is coupled, at a proper position of an inner circumference of the inner channel main outlet in a circumferential direction.

Here, the pins of the debris filter may have a circular cross section, intersect each other in a crisscross shape in the middle of each thereof, be inserted into the through-holes, and be fixed by a welding.

Further, the pins of the debris filter may have a circular cross section, intersect each other in a grid shape in the middle of each thereof, be inserted into the through-holes, and be fixed by a welding.

Furthermore, the debris filter may include at least two pins with a circular cross section, one of which is disposed in a horizontal direction, and another of which is disposed in a horizontal direction and are bent downward to form a "V" shape. The two pins may intersect each other in a crisscross shape, be inserted into the through-holes, and be fixed by a welding.

Further, the inner channel auxiliary inlets, into which the cooling water flows, may be radially formed in an upper wall of the lower end plug at predetermined intervals, and may be vertically arranged in at least one row.

Furthermore, the inner channel auxiliary inlets of the lower end plug may be inclined at a predetermined angle.

The lower end plug may include a lower handling groove into which a fuel rod handling tool is coupled at a proper position of an outer circumference thereof in a circumferential direction.

Further, a lower end plug may include a lower inclined face that is inclined at a predetermined angle at a lower end thereof such that the outer diameter thereof is decreased in a downward direction.

Furthermore, an upper end plug may include an upper inclined face that is inclined at a predetermined angle at a lower end thereof such that the outer diameter thereof is decreased in an upward direction.

In addition, an upper handling hole, into which a fuel rod handling tool is coupled, is at least one in number.

BRIEF DESCRIPTION OF THE DRAWINGS

The above and other objects, features and other advantages of the present invention will be more clearly understood from the following detailed descriptions when taken in conjunction with the accompanying drawings, in which.

DETAILED DESCRIPTION OF THE INVENTION

Reference will now be made in greater detail to an exemplary embodiment of the invention, an example of which is illustrated in the accompanying drawings. Wherever possible, the same reference numbers will be used throughout the drawings and the descriptions, to refer to the same or like parts.

Figure 1:
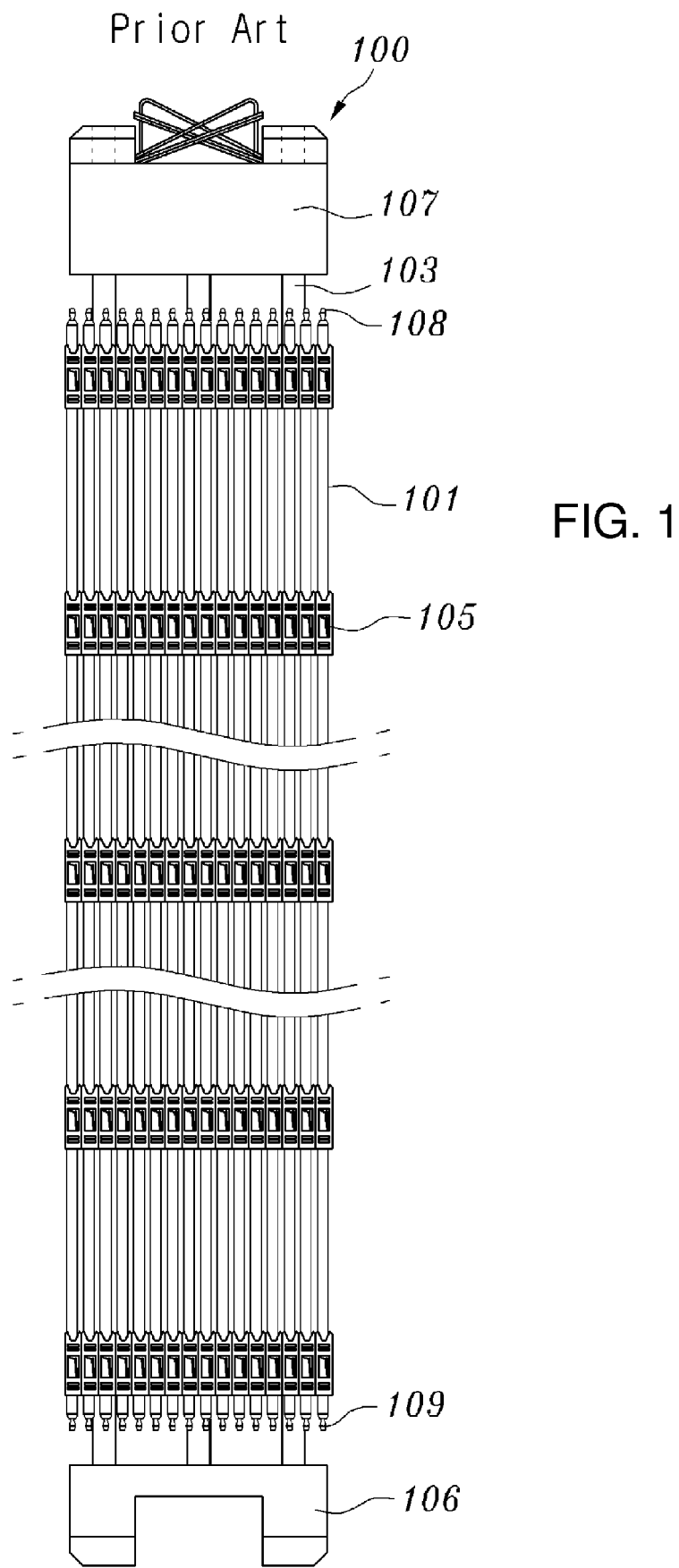
FIG. 1 is a schematic front view illustrating a nuclear fuel assembly with the cylindrical fuel rods of the related art
Figure 2:
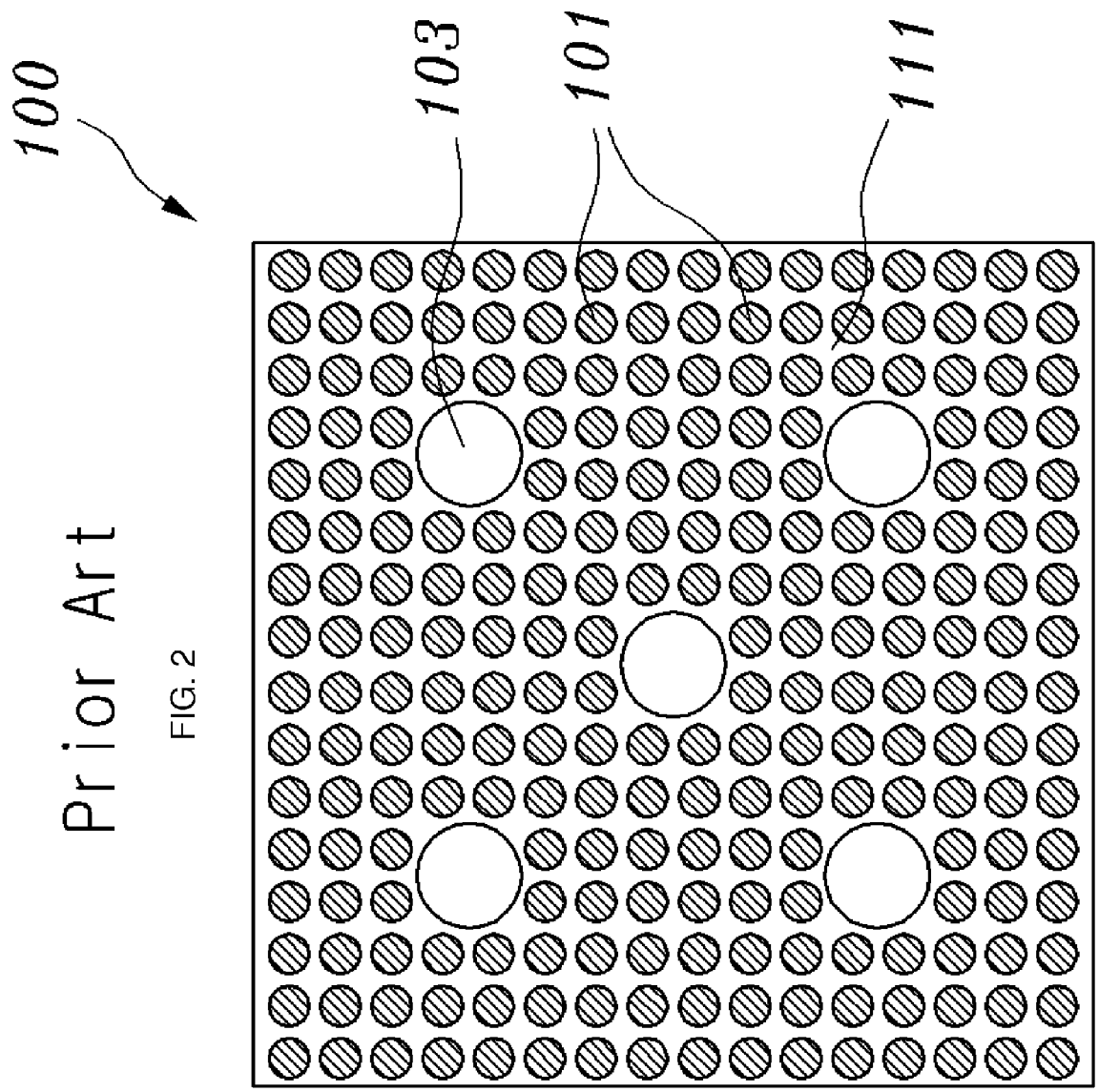
FIG. 2 is a schematic plan view illustrating a nuclear fuel assembly with the cylindrical fuel rods of the related art
Figure 3:
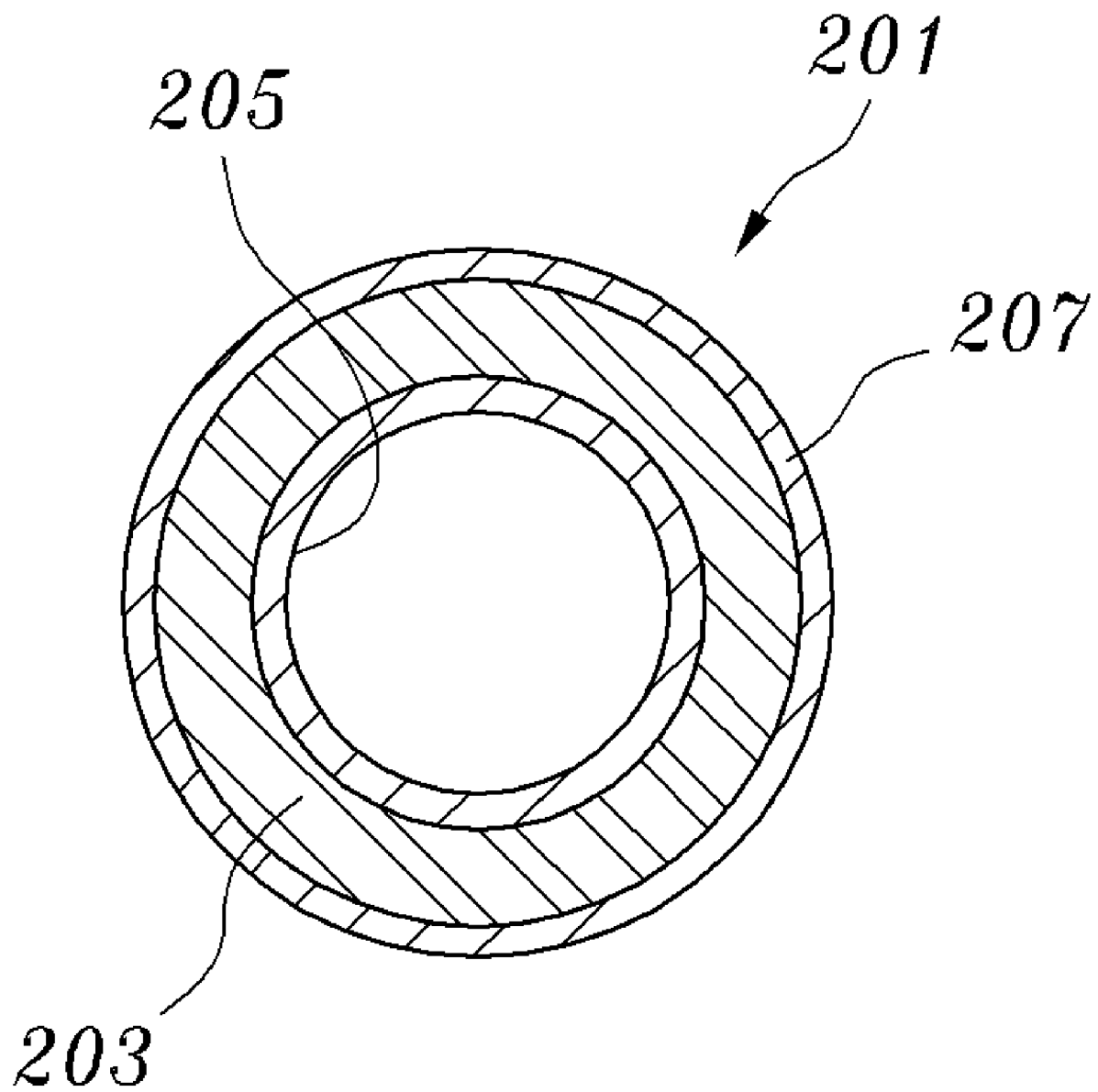
FIG. 3 is a schematic transverse sectional view illustrating an annular fuel rod of the related art
Figure 4:
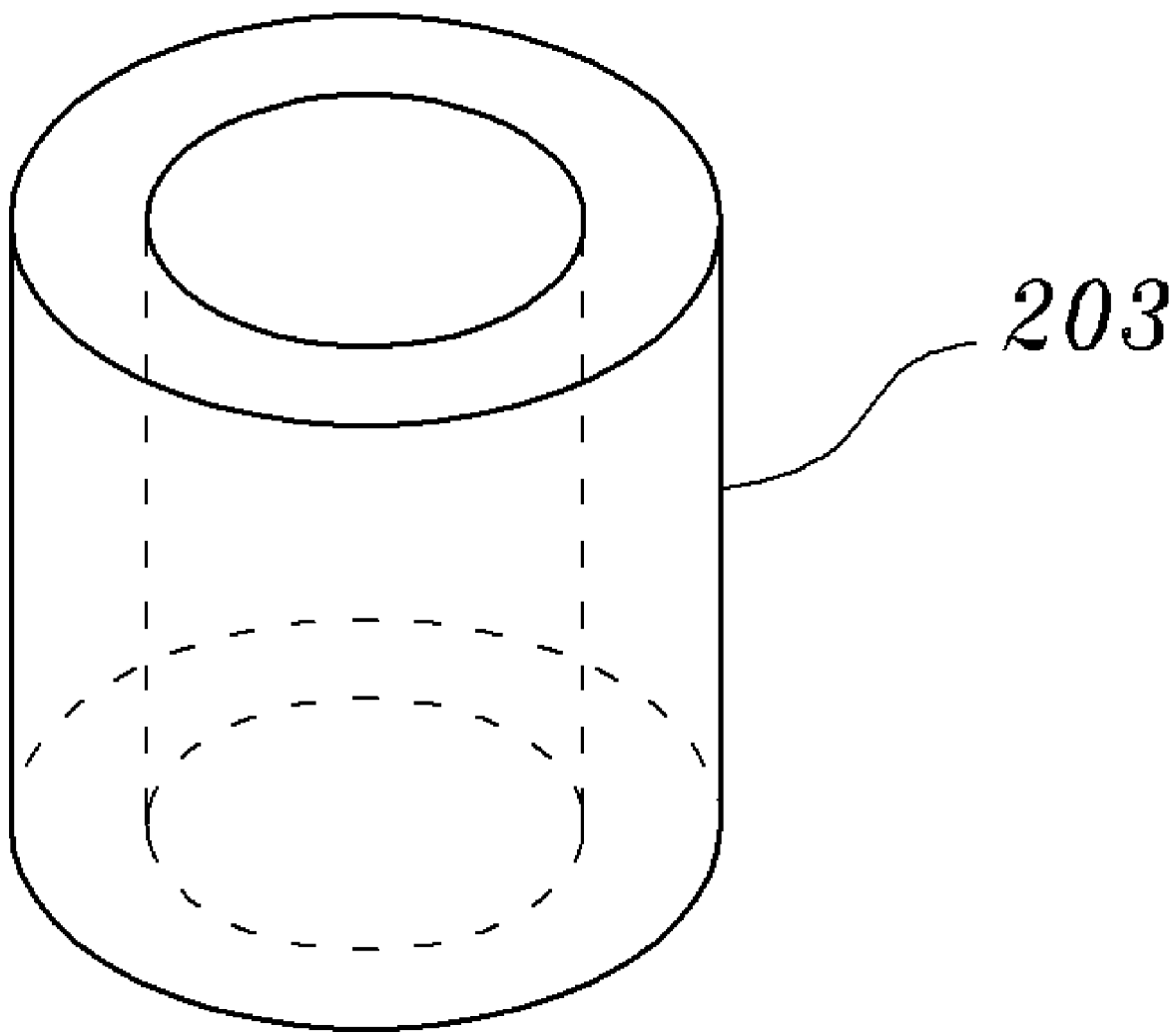
FIG. 4 is a schematic perspective view illustrating a pellet inserted into an annular fuel rod of the related art
Figure 5:
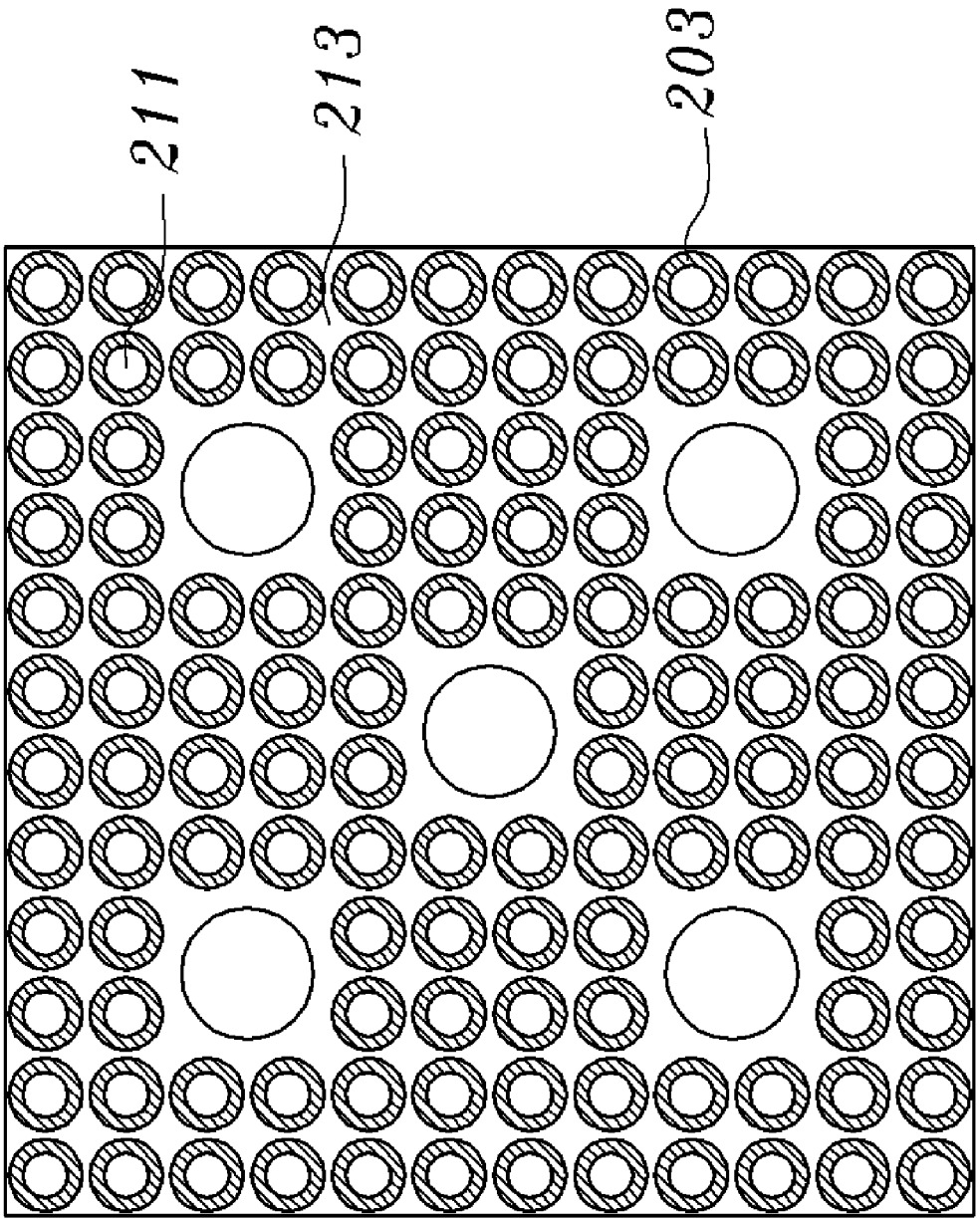
FIG. 5 is a schematic plan view illustrating another a nuclear fuel assembly with annular fuel rods of the related art
Figure 6:
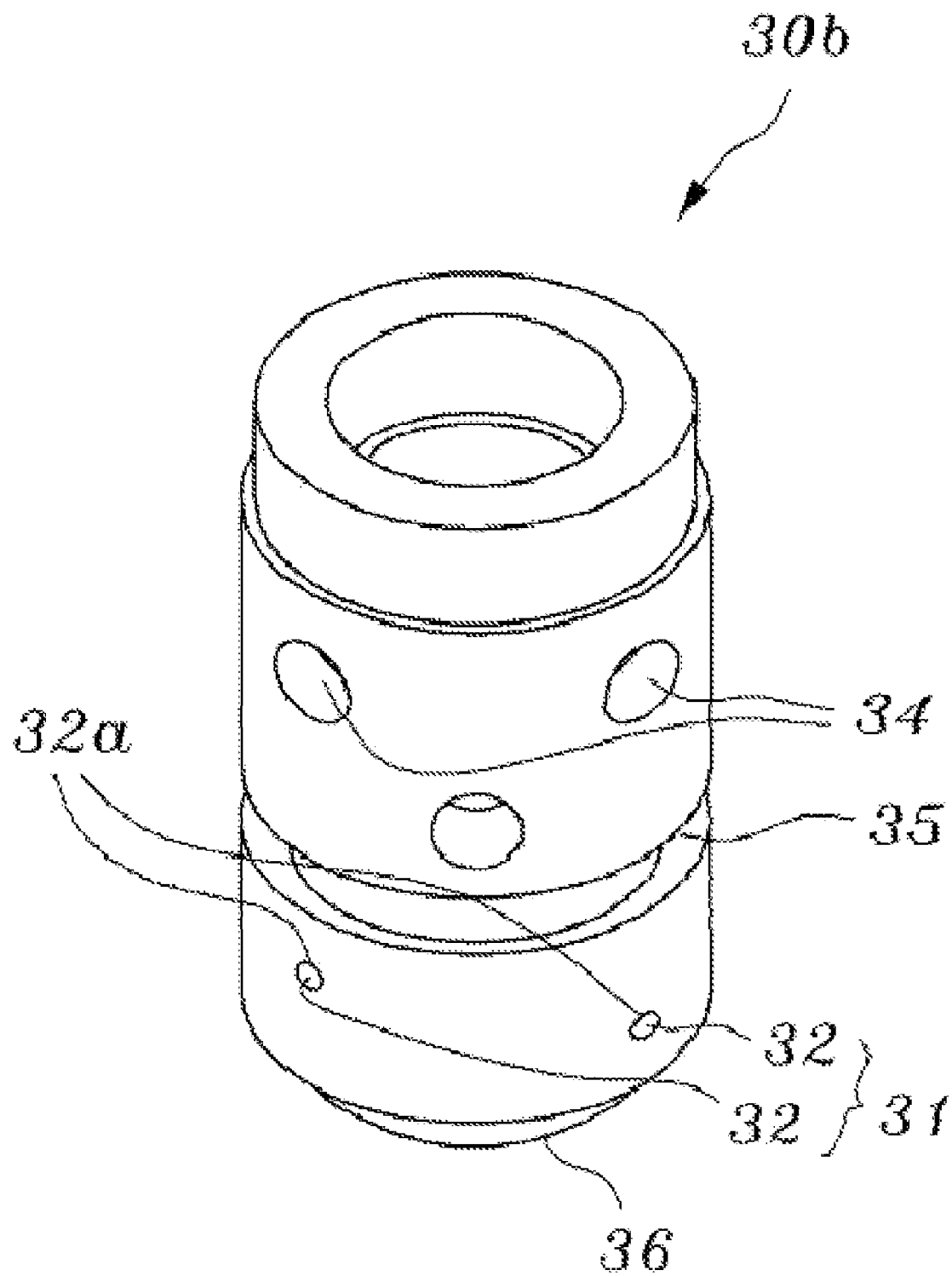
FIG. 6 is a schematic perspective view illustrating a lower end plug of the lower and upper end plugs of an annular fuel rod according to an embodiment of the present invention
Figure 7:
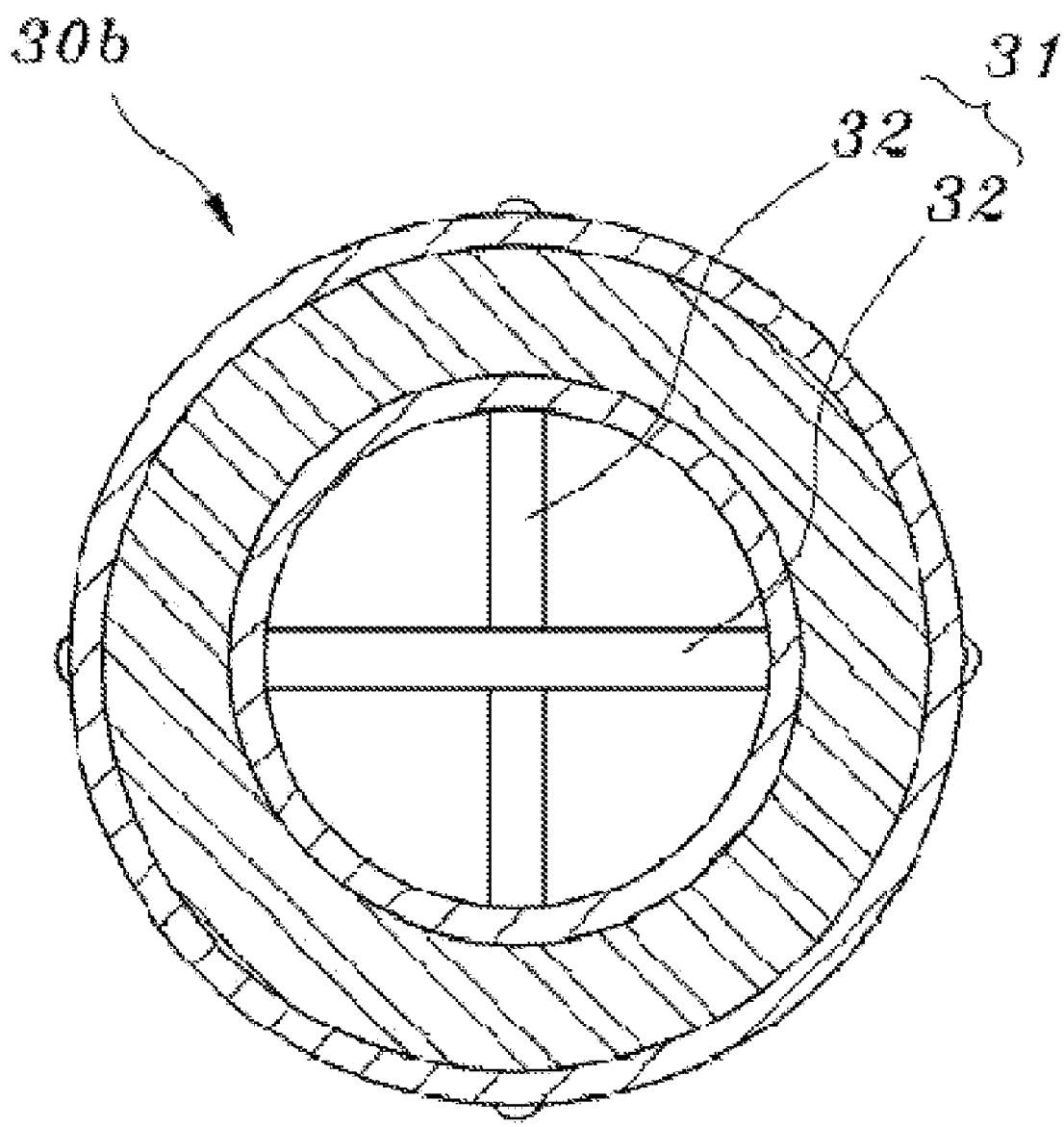
FIG. 7 is a schematic transverse sectional view illustrating a lower end plug of the lower and upper end plugs of an annular fuel rod according to an embodiment of the present invention
Figure 8:
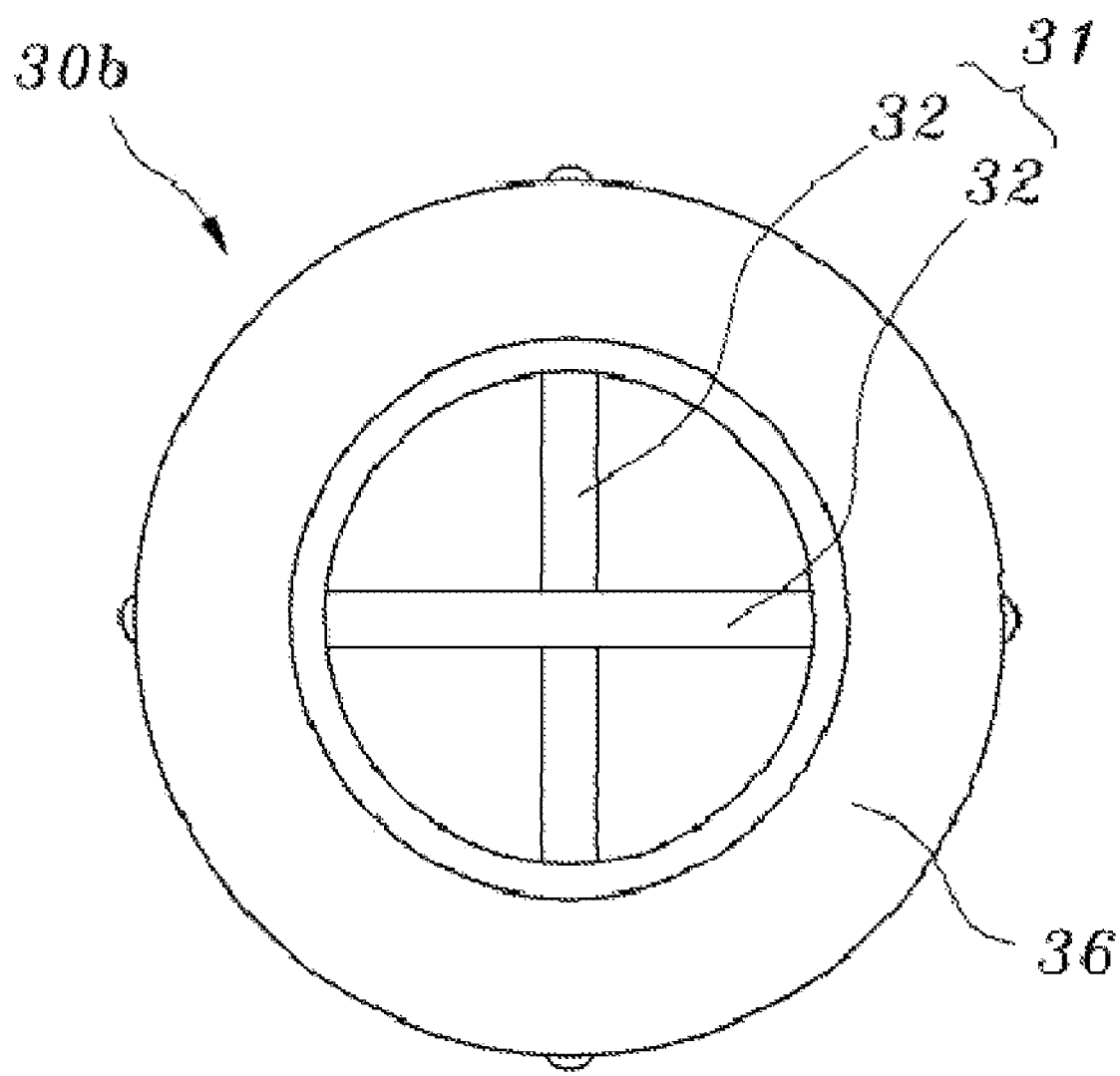
FIG. 8 is a schematic bottom view illustrating a lower end plug of the lower and upper end plugs of an annular fuel rod according to an embodiment of the present invention
Figure 9:
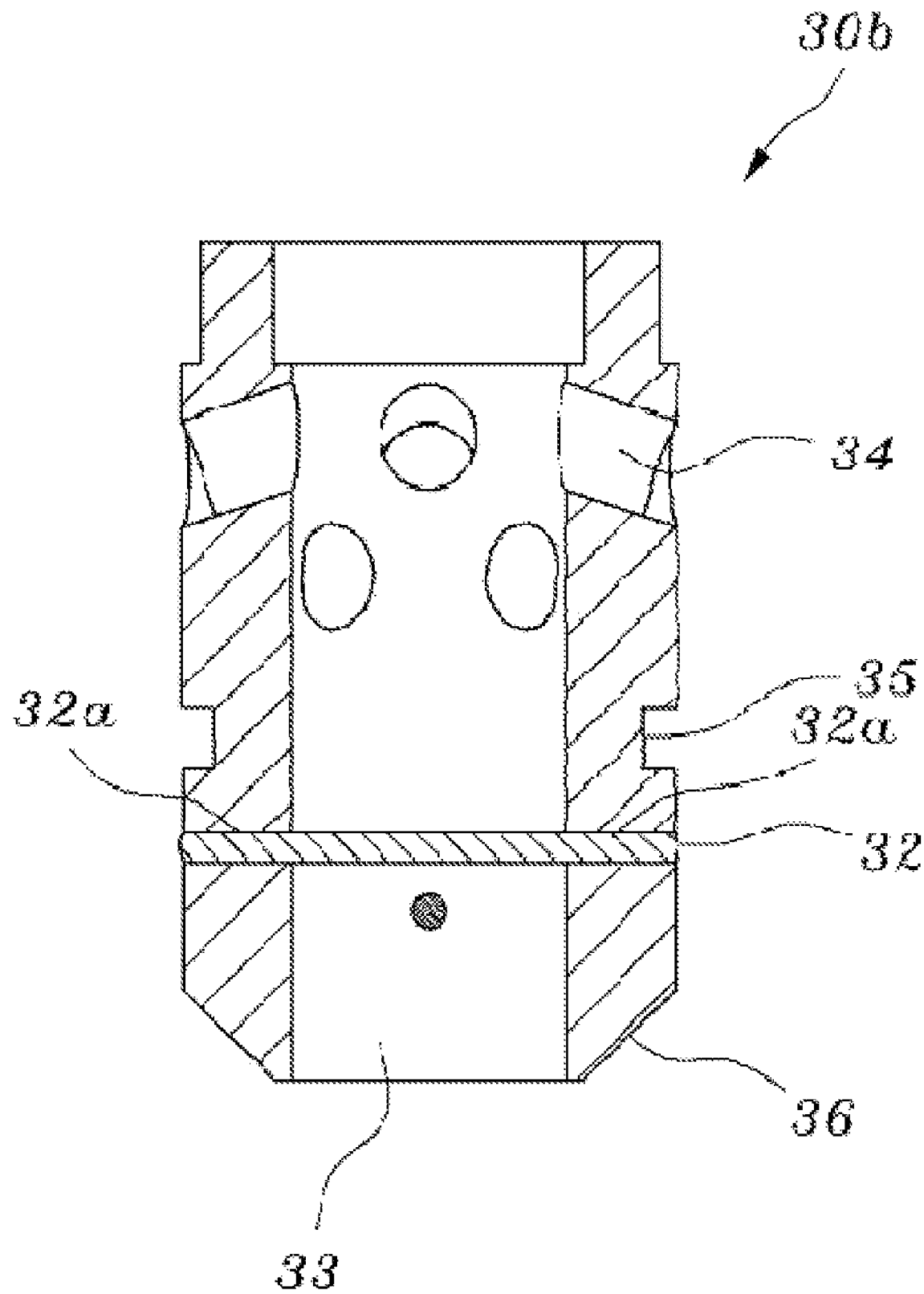
FIG. 9 is a schematic longitudinal sectional view illustrating a lower end plug of the lower and upper end plugs of an annular fuel rod according to an embodiment of the present invention
Figure 10:
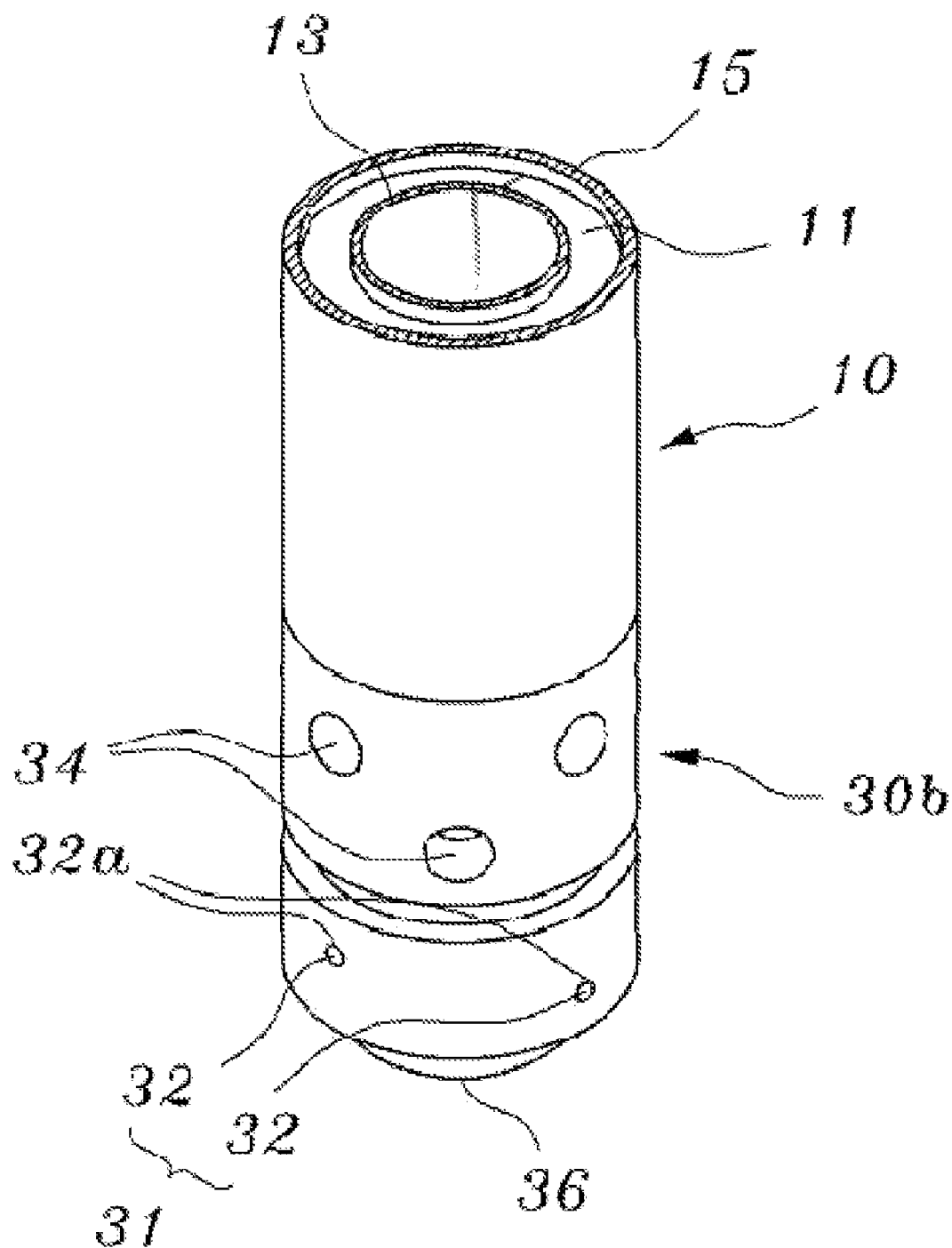
FIG. 10 is a schematic perspective view illustrating a lower end plug of the lower and upper end plugs of an annular fuel rod according to an embodiment of the present invention, wherein the lower end plug is coupled to the annular fuel rod.
Figure 11:
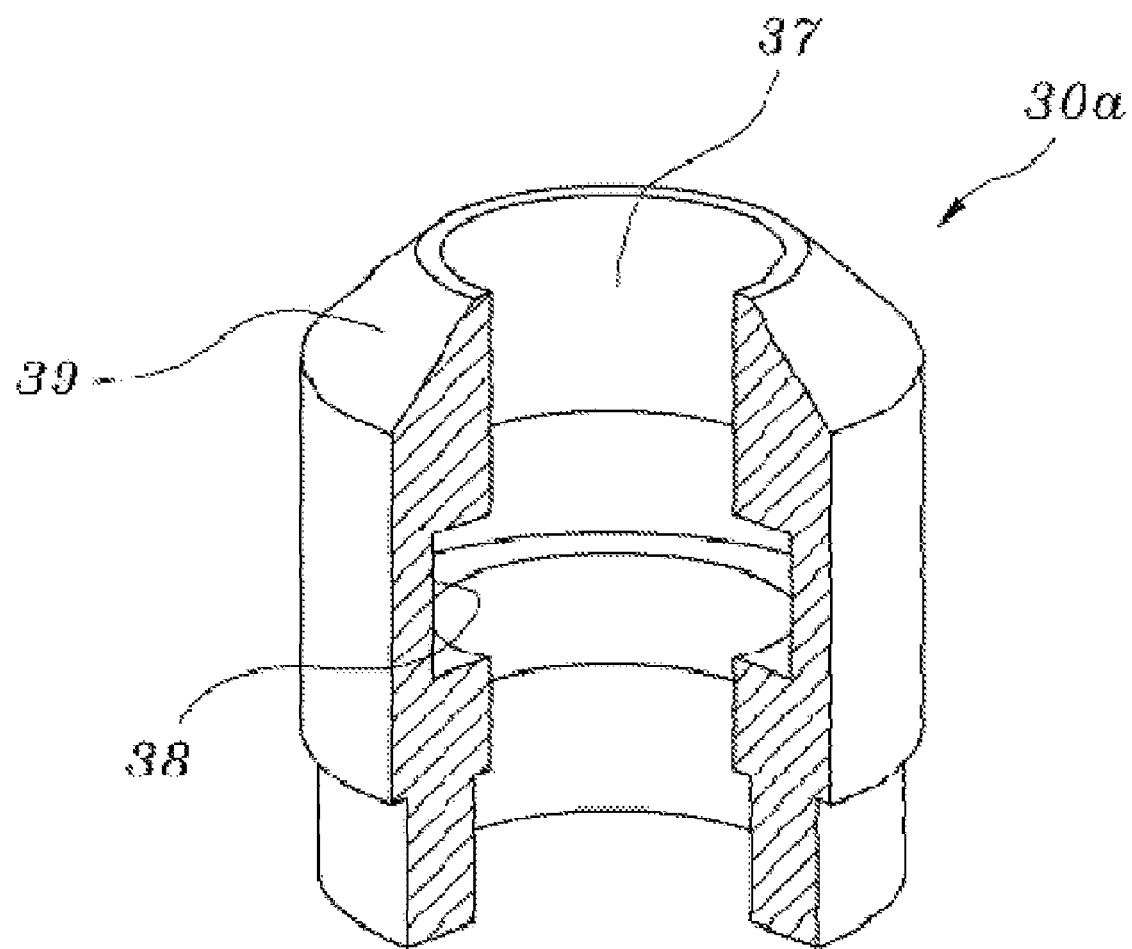
FIG. 11 is a schematic cutaway view illustrating an upper end plug of the lower and upper end plugs of an annular fuel rod according to an embodiment of the present invention
Figure 12:
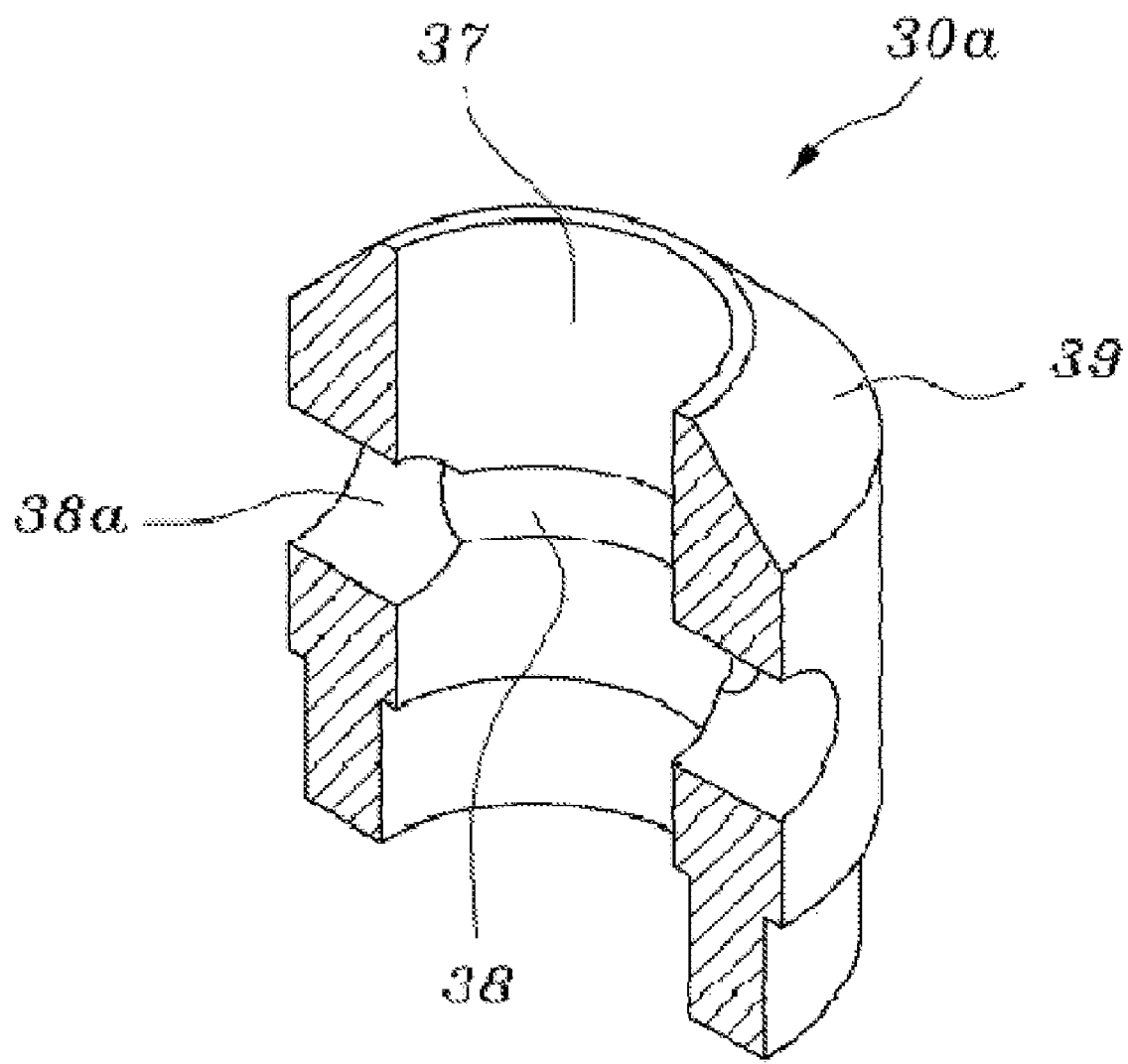
FIG. 12 is a schematic longitudinal sectional perspective view illustrating an upper end plug of the lower and upper end plugs of an annular fuel rod according to an embodiment of the present invention

FIG. 6 is a schematic perspective view illustrating a lower end plug of the lower and upper end plugs of an annular fuel rod according to an embodiment of the present invention. FIG. 7 is a schematic transverse sectional view illustrating a lower end plug of the lower and upper end plugs of an annular fuel rod according to an embodiment of the present invention. FIG. 8 is a schematic bottom view illustrating a lower end plug of the lower and upper end plugs of an annular fuel rod according to an embodiment of the present invention. FIG. 9 is a schematic longitudinal sectional view illustrating a lower end plug of the lower and upper end plugs of an annular fuel rod according to an embodiment of the present invention. FIG. 10 is a schematic perspective view illustrating a lower end plug of the lower and upper end plugs of an annular fuel rod according to an embodiment of the present invention, wherein the lower end plug is coupled to the annular fuel rod. FIG. 11 is a schematic cutaway view illustrating an upper end plug of the lower and upper end plugs of an annular fuel rod according to an embodiment of the present invention. FIG. 12 is a schematic longitudinal sectional perspective view illustrating an upper end plug of lower and upper end plugs of an annular fuel rod according to an embodiment of the present invention.

As illustrated, an annular fuel rod 10 comprises at least one annular pellet 11, inner and outer cladding tubes 13 and 15 provided inside and outside a pellet 11, and lower and upper end plugs 30b and 30a.

The lower end plug 30b is installed at the lower end of the annular fuel rod 10, has a cylindrical shape, and includes an inner channel main inlet 33, in the center of which an inner channel (not numbered) is formed and into which cooling water flows.

Here, the inner channel main inlet 33 of the lower end plug 30b is provided with a debris filter 31, which prevents an inflow of external debris at a proper position thereof. In order to insert and install the debris filter 31, the lower end plug 30b is provided with through-holes 32a at a proper position of the lower portion thereof.

At this time, the debris filter 32, which is installed at a proper position of the inner channel main inlet 33 of the lower end plug 30b, is made up of a plurality of pins with a long rod shape, and has a crisscross shape in which the pins intersect with each other.

More specifically, in order to prevent the debris from flowing from the outside into the inner channel through the inner channel main inlet 33 of the lower end plug 30b, the inner channel main inlet 33 of the lower end plug 30b is equipped with a debris filter 31, in which a plurality of pins 32 intersect with each other to from a crisscross shape.

Each pin 32 of the debris filter 31 is fitted into a through-hole 32a, which is formed in the lower portion of the lower end plug 30b, and then it is fixed by a welding.

Here, each pin 32 of the debris filter 31 preferably has a circular cross section, but it may have various shapes, such as a streamlined shape including an oval shape, a triangular shape, a quadrilateral shape, and so on.

As described above, the debris filter 31 installed in the inner channel main inlet 33 of the lower end plug 30b allows only the cooling water excluding the debris to flow into the inter channel, so that the inside of the annular fuel rod 10 is prevented from being blocked by the debris.

Here, the lower end of the lower end plug 30b has a lower inclined face 36 inclined at a predetermined angle such that the outer diameter thereof is decreased in a downward direction.

In this manner, the lower inclined face 36, which is inclined at the lower end of the lower end plug 30b at a predetermined angle, allows the debris to slide easily to the outside of the lower end plug 30b when the debris comes into contact with the lower end of the lower end plug 30b, thereby preventing the debris from flowing into the inner channel main inlet 33 of the lower end plug 30b.

Further, the lower end plug 30b is provided, at a proper position thereof, with at least one inner channel auxiliary inlet 34, into which the cooling water flows in a horizontal direction and passes through an upper wall of the lower end plug 30b.

If the amount of cooling water flowing through the inner channel main inlet 33 of the lower end plug 30b is reduced, i.e. when the debris is caught up in the debris filter 31 installed in the inner channel main inlet 33 of the lower end plug 30b, and thereby obstructs the inflow of cooling water, which flows into the inner channel of the inner channel main inlet 33, to reduce the amount of-cooling water flowing into the inner channel of the annular fuel rod 10, the lower end plug 30b has a plurality of inner channel auxiliary inlets 34 passing through the upper wall thereof in a horizontal direction so as to allow for a flow the cooling water into the inner channel of the annular fuel rod 10.

With the above-mentioned structure and geometry, when not flowing smoothly through the inner channel main inlet 33, the cooling water flows through the inner channel auxiliary inlets 34 passing through the upper wall of the lower end plug 30b, so that the inner surface of the annular fuel rod 10 is smoothly cooled to prevent the temperature of the fuel rod 10 from increasing excessively.

In the embodiment of the present invention, the inner channel auxiliary inlets 34 are radially formed in the upper wall of the lower end plug 30b. Preferably, the inner channel auxiliary inlets 34 can be varied in size and number.

Furthermore, the inner channel auxiliary inlets 34 are radially formed in the upper wall of the lower end plug 30b at predetermined intervals, and are vertically arranged in one or more rows.

Furthermore, in the embodiment of the present invention, the inner channel auxiliary inlets 34, with the shape of a through hole, are horizontally formed in the upper wall of the lower end plug 30b. However, as illustrated in FIG. 9, each inner channel auxiliary inlet 34 can be formed in the upper wall of the lower end plug 30b so as to be inclined at a predetermined angle.

As described above, because the inner channel auxiliary inlets 34 are formed in the upper wall of the lower end plug 30b so as to be inclined at a predetermined angle, these inclined inner channel auxiliary inlets 34 can reduce a pressure loss attributed to a specific shape, when compared to the horizontal ones.

Here, a lower end plug 30b is provided with a lower handling groove 35, to which a fuel rod handling tool is coupled, at a proper position of an outer circumference thereof in a circumferential direction. In other words, in order to allow for a fuel rod handling tool for handling each fuel rod 10 of the nuclear fuel assembly to be coupled, the lower handling groove 35 is formed at a proper position of the outer circumference of the lower end plug 30b in the circumferential direction.

In the embodiment of the present invention, the outer circumference of the lower end plug 30b has a lower handling groove 35, to which a fuel rod handling tool is coupled, in the circumferential direction. However, a lower end plug 30b may be preferably provided with at least one lower handling hole (not shown), which has a shape corresponding to at least one upper handling hole 38a into which a fuel rod handling tool is inserted at the proper position of an upper handling groove 38 of the upper end plug 30a.

Due to this configuration, when the lower end plug 30b is transferred by using a fuel rod handling tool, the fuel rod handling tool is inserted into the lower handing holes of the lower handling groove 35 of the lower end plug 30b, and then the fuel rod is transferred.

The upper end plug 30a is installed at the upper end of the annular fuel rod 10, has the shape of a hollow cylinder, and includes an inner channel main outlet 37, at the center of which an inner channel is formed and out of which the cooling water flows.

Here, an upper end plug 30a is provided with an upper handling groove 38, to which a fuel rod handling tool (not shown) is coupled, at a proper position of an inner circumference thereof in a circumferential direction so as to handle each fuel rod 10 of the nuclear fuel assembly (not shown).

At this time, the upper handling groove 38, which is formed at a proper position of the inner channel main outlet 37 of the upper end plug 30a, has a quadrilateral cross section.

Although the upper handling groove 38, which is formed at a proper position of the inner channel main outlet 37 of the upper end plug 30a, is formed in a quadrilateral shape in the embodiment of the present invention, the upper handling groove 38 may be formed in various shapes, such as a polygonal shape, a semicircular shape, and so on.

Meanwhile, an upper end plug 30a is provided with at least one upper handling hole 38a, into which a fuel rod handling tool is inserted at a proper position of the upper handling groove 38 of the upper end plug 30a. The fuel rod handling tool is coupled into the upper handling hole 38a, and then the fuel rod 10 is transferred.

The upper end plug 30a is provided with an upper inclined face 39, which is inclined at a predetermined angle such that the outer diameter thereof is decreased in an upward direction.

Figure 13:
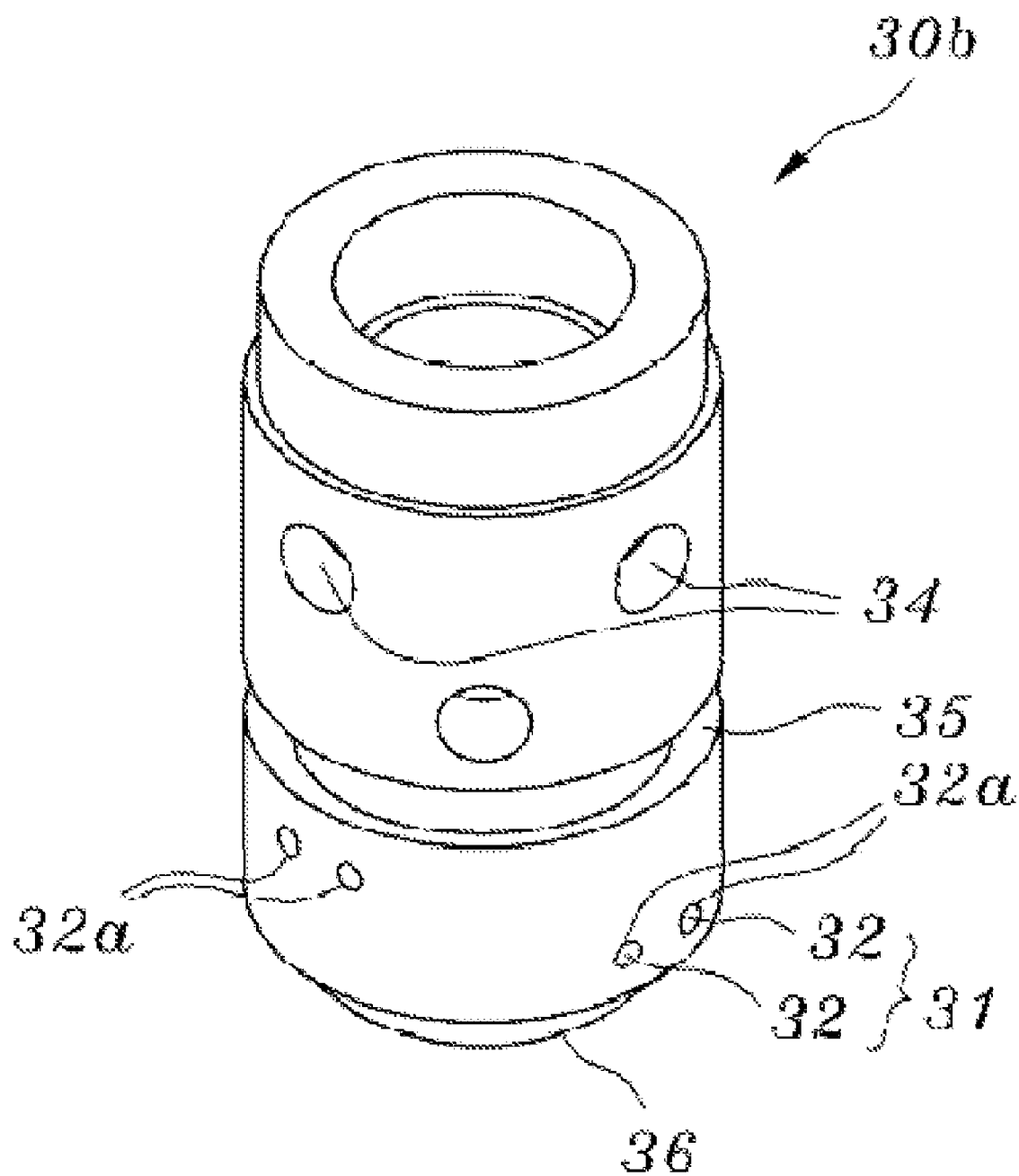
FIG. 13 is a schematic perspective view illustrating a lower end plug of the lower and upper end plugs of an annular fuel rod according to another embodiment of the present invention
Figure 14:
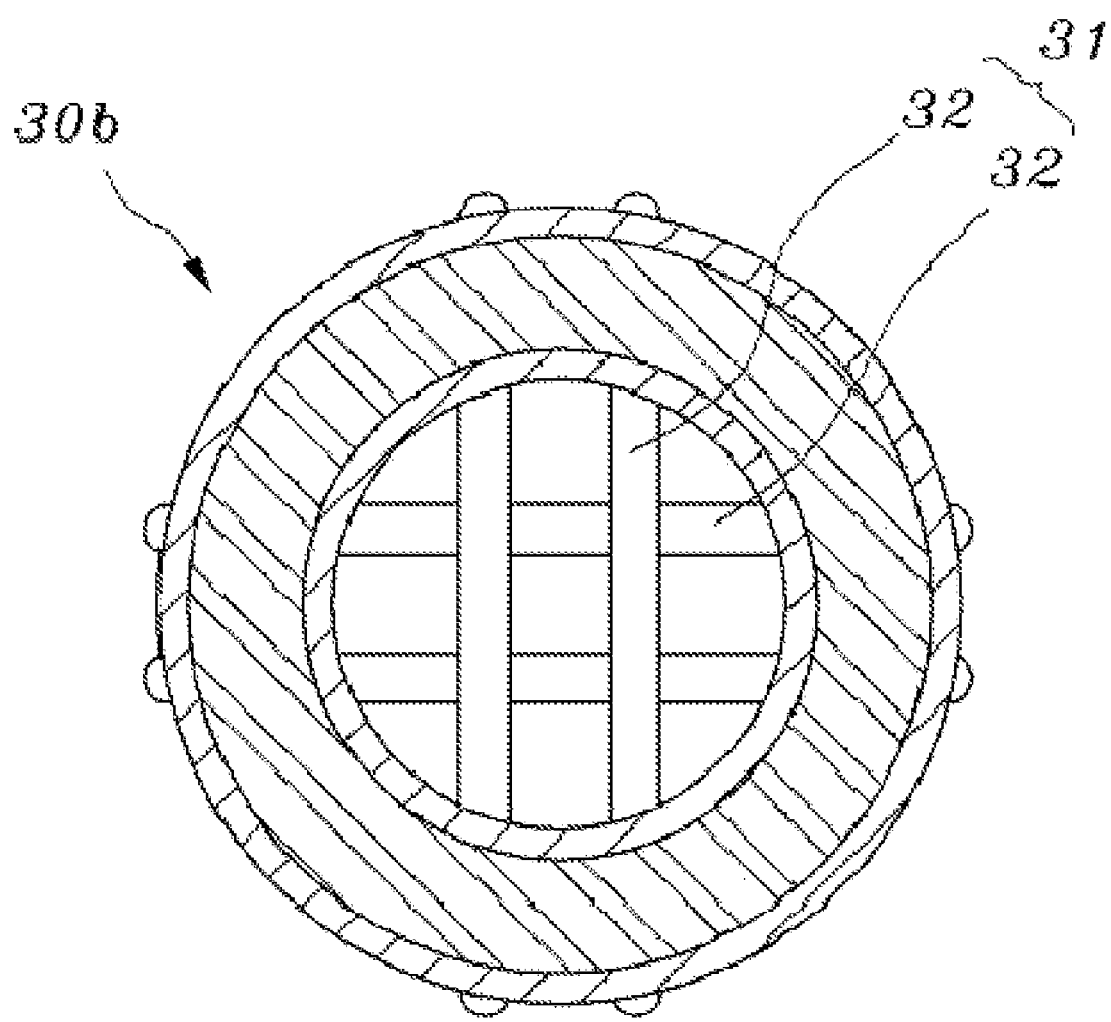
FIG. 14 is a schematic transverse sectional view illustrating a lower end plug of the lower and upper end plugs of an annular fuel rod according to another embodiment of the present invention

FIG. 13 is a schematic perspective view illustrating a lower end plug of the lower and upper end plugs of an annular fuel rod according to another embodiment of the present invention. FIG. 14 is a schematic transverse sectional view illustrating a lower end plug of the lower and upper end plugs of an annular fuel rod according to another embodiment of the present invention, wherein the structure of a debris filter installed in the lower end plug for the annular fuel rod is partly modified.

As illustrated, the lower end plug 30b of the annular fuel rod 10 according to another embodiment of the present invention is provided with a debris filter 31, which functions to prevent debris from flowing from the outside, at the proper position of an inner channel main inlet 33 thereof. The debris filter 31 has the shape of a grid in which pins 32 with rod shapes intersect each other.

In other words, the grid-like debris filter 31, in which the pins 32 intersect with each other, is installed at the proper position of the inner channel main inlet 33 of the lower end plug 30b, and thus prevents the introduction of debris. Thereby, only the cooling water can flow into the inter channel of the annular fuel rod 10.

The pins 32 of the grid-like debris filter 31 are fitted into through-holes 32a formed in the lower portion of the lower end plug 30b, and are fixed by a welding.

Here, the number of through-holes 32a of the lower end plug 30b is eight such that the pins 32 forming the debris filter 31 are fitted into the through-holes 32a.

In this embodiment, the lower end plug 30b has eight through-holes 32a and four pins 32 fitted into the through-holes 32a. However, as long as the pins 32 maintain an intersecting grid shape and prevent the debris from being allowed to flow into the inner channel main inlet 33, they are not limited to that number. Preferably, the number of pins 32 corresponds to the number of through-holes 32a.

Meanwhile, in this embodiment, each pin 32 constituting the debris filter 31 preferably has a circular cross section. However, the cross section of each pin 32 may have various shapes, such as a streamlined shape including an oval shape, a triangular shape, a quadrilateral shape, and so on.

Figure 15:
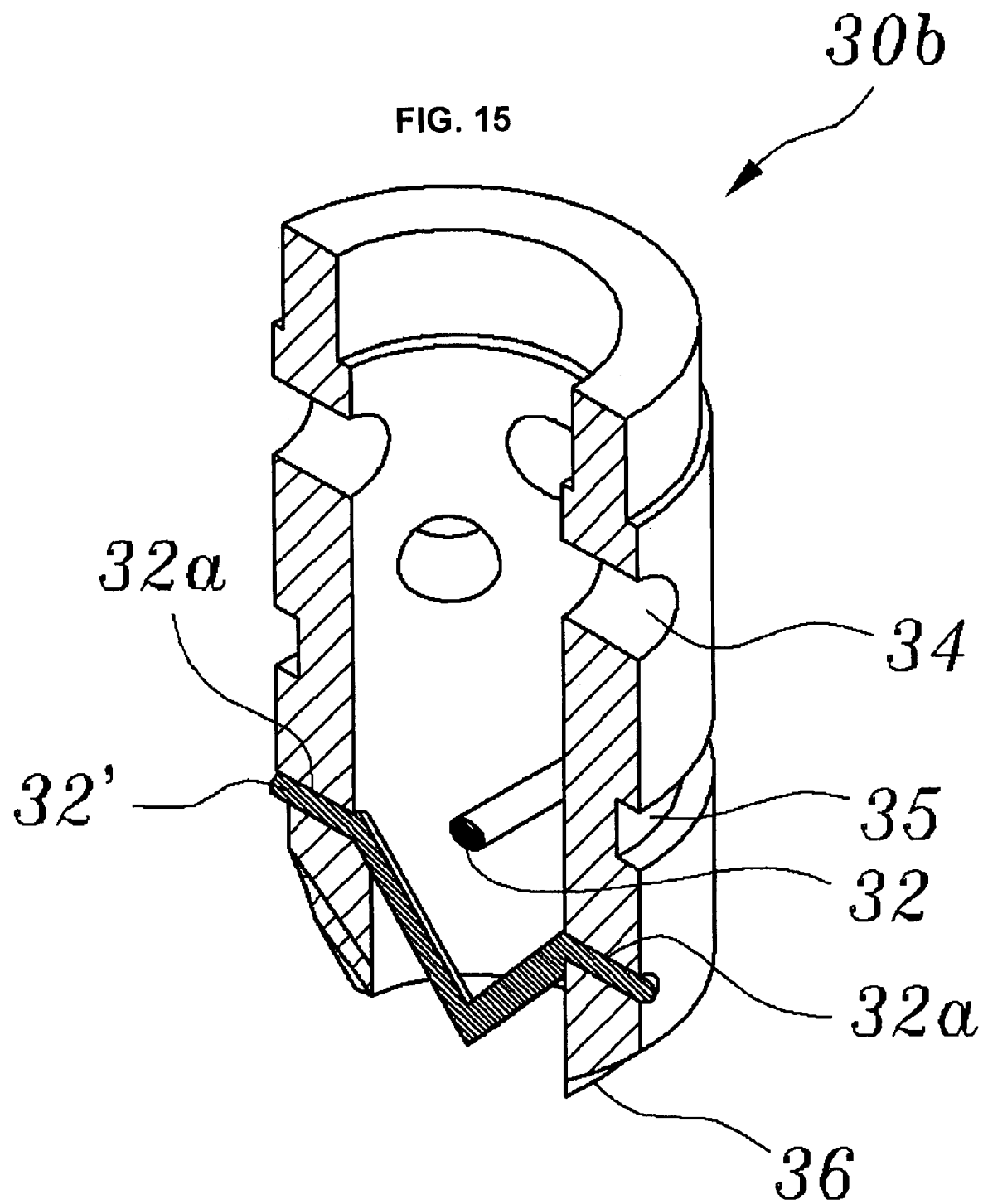
FIG. 15 is a schematic sectional perspective view illustrating a lower end plug of the lower and upper end plugs of an annular fuel rod according to yet another embodiment of the present invention and FIG. 16 is a schematic transverse sectional view illustrating a lower end plug of the lower and upper end plugs of an annular fuel rod according to yet another embodiment of the present invention.
Figure 16:
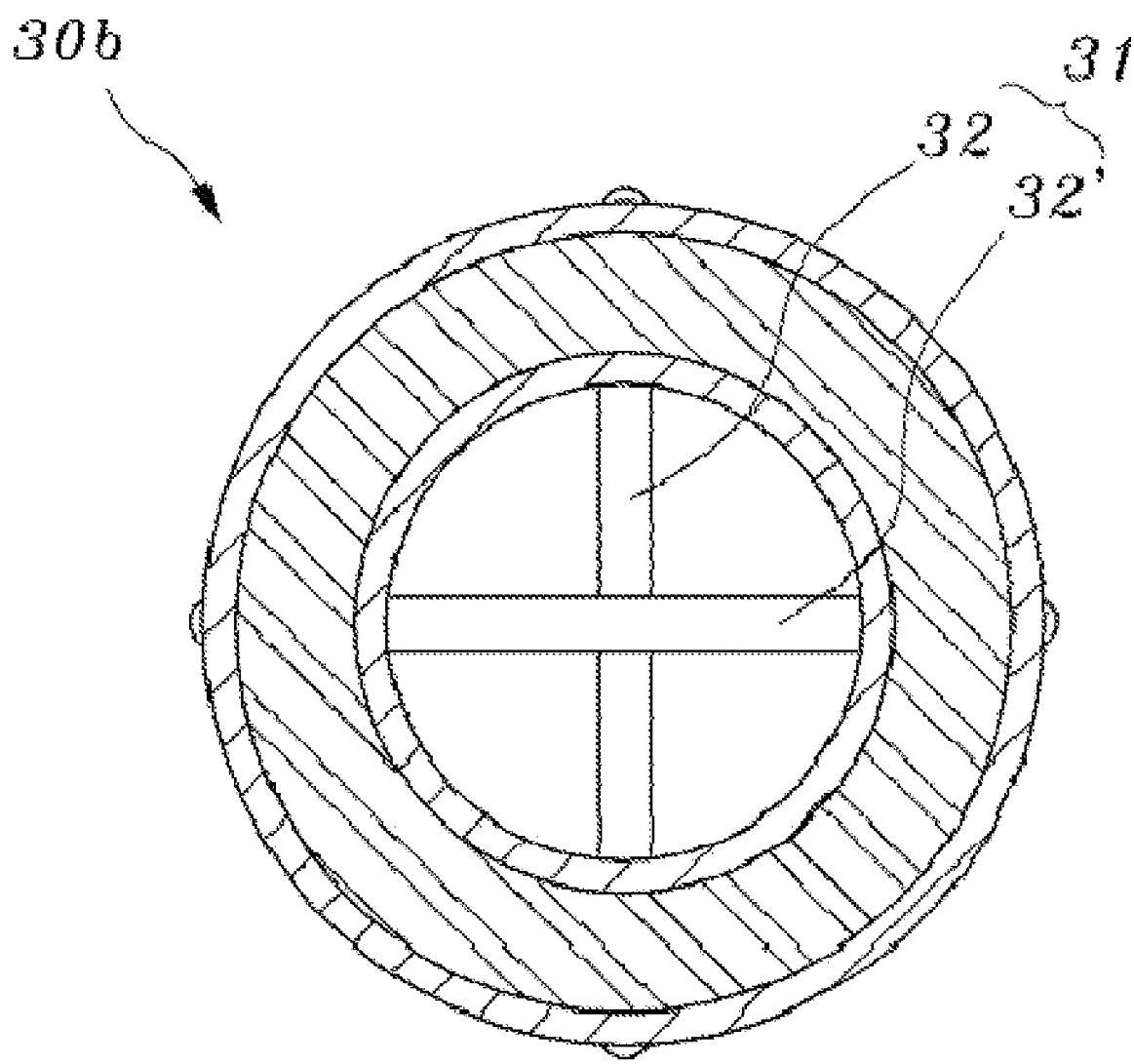

FIG. 15 is a schematic sectional perspective view illustrating a lower end plug of the lower and upper end plugs of an annular fuel rod according to yet another embodiment of the present invention. FIG. 16 is a schematic transverse sectional view illustrating a lower end plug of the lower and upper end plugs of an annular fuel rod according to yet another embodiment of the present invention, wherein the structure of a debris filter installed in the lower end plug of the annular fuel rod is partly modified.

As illustrated, the lower end plug 30b of the fuel rod 10 according to yet another embodiment of the present invention is provided with a debris filter 31, which functions to prevent debris from being allowed to flow from the outside, at the proper position of an inner channel main inlet 33 thereof.

Here, the debris filter 31 is constituted of at least two rod-like pins 32 and 32', one 32 of which is disposed in a horizontal direction, and the other 32' of which is disposed in a horizontal direction and are bent downward to form a "V" shape. Thereby, one pin 32 intersects with the other pin 32' when viewed from the top.

At this time, the angular point of the V-shaped pin 32' is flush with the lower end of the lower end plug 30b, and serves as a support that prevent the debris from moving toward the inner channel of the lower end plug 30b when the debris is caught up at the lower end of the lower end plug 30b. Thereby, the V-shaped pin 32' prevents the debris from flowing easily flowed into the inner channel through the inner channel main inlet 33.

In this embodiment, the pins 32 and 32' constituting the debris filter 31 intersect with each other in a manner such that the first one 32 thereof is disposed in a horizontal direction and that the second one 32' thereof is disposed in a horizontal direction and are bent downward to form a "V" shape. Alternatively, the pins 32 and 32' may intersect with each other in a manner such that the first one 32 thereof are bent downward to form a "V" shape, like the second one 32'.

Meanwhile, the pins 32 and 32' of the debris filter 31 are inserted into through-holes 32a, which are formed in the lower portion of the lower end plug 30b, and then they are fixed by a welding.

In this embodiment, each of the pins 32 and 32' constituting the debris filter 31 preferably has a circular cross section, but they may have various shapes such as a streamlined shape including an oval shape, a triangular shape, a quadrilateral shape, and so on.

As described above, according to the lower and upper end plugs of the annular fuel rod, the debris filter is installed in the inner channel main inlet of the lower end plug, thereby intercepting an inflow of debris, and at least one inner channel auxiliary inlet with a through-hole shape is formed in a cylindrical wall of the lower end plug, thereby supplying cooling water when the debris is caught up in the filter to thus prevent the inner surface temperature of the fuel rod from increasing by excessively. Further, an upper end plug is provided with a groove in which a tool for pulling a fuel rod is located, thereby making it easy to handle a fuel rod when a nuclear fuel assembly is being assembled or disassembled.

Although a preferred embodiment of the present invention has been described for illustrative purposes, those skilled in the art will appreciate that the various modifications, additions and substitutions are possible, without departing from the scope and spirit of the invention as disclosed in the accompanying claims.

What is claimed is:

1. A fuel rod, comprising:
   a hollow cylindrical rod having an upper end having a water outlet and a lower end having a water inlet;
   an upper end plug connected to said upper end and defining an upper outlet channel disposed in fluid communication with said water outlet;
   a lower end plug connected to said lower end and defining a main inlet channel disposed in fluid communication with said water inlet; and
   a debris filter disposed in said main inlet channel, said debris filter comprises a plurality of intersecting pins extending across said main inlet channel, said plurality of intersecting pins are fitted within a plurality of radially disposed through-holes formed in said lower end plug, said upper end plug is provided with an upper inclined face on an exterior surface thereof, said upper end plug includes an upper handling groove circumferentially formed in an interior surface thereof to receive a fuel rod handling tool, said interior surface of the upper end plug defines the upper outlet channel, said lower end plug comprises an upper cylindrical portion above said debris filter and a lower cylindrical portion below said debris filter, said upper cylindrical portion includes a plurality of inner channel auxiliary inlets inclined at an upward angle with respect to a plane of the debris filter, wherein said plurality of inner channel auxiliary inlets form a cooling water fluid by-pass around said debris filter in the event the debris filter becomes blocked by debris.

2. The fuel rod as set forth in claim 1, wherein the pins of the debris filter have a circular cross section, intersect each other in a crisscross shape in the middle of each thereof.

3. The fuel rod as set forth in claim 1, wherein the pins of the debris filter have a circular cross section, intersect with each other as a grid shape in the middle of each thereof.

4. The fuel rod as set forth in claim 1, wherein the debris filter includes two pins with a circular cross section, one of which is disposed in a horizontal direction, and the other of which is disposed in a horizontal direction and bent downward to form a "V" shape, the two pins intersecting each other as a crisscross shape.

5. The fuel rod as set forth in claim 1, wherein the inner channel auxiliary inlets are radially formed in the lower end plug at predetermined intervals, and are vertically arranged in at least one row.

* * * * *